A. TÖRNQUIST.
Pitman-Connection.

No. 210,646. Patented Dec. 10, 1878.

Witnesses:
Inventor:

UNITED STATES PATENT OFFICE.

ALFRED TORNQUIST, OF NEW YORK, ASSIGNOR TO RUFUS DUTTON, OF YONKERS, N. Y.

IMPROVEMENT IN PITMAN-CONNECTIONS.

Specification forming part of Letters Patent No. 210,646, dated December 10, 1878; application filed May 16, 1878.

*To all whom it may concern:*

Be it known that I, ALFRED TORNQUIST, of the city of New York, in the county of New York and State of New York, have invented a new and useful Improvement in Pitman-Connections, of which the following is a specification:

The invention relates to pitman-connections made with universal joints, the wear of which by use is automatically taken up.

Heretofore pitmen having universal joints, and designed to take up the wear automatically, have been constructed by using a ball having sockets placed upon both sides, or a socket on one side only, such sockets being clamped against the ball by a wedge and spring, but not in the direction of the thrust. In use they have been found to be objectionable, because the edges of the sockets wore more rapidly than at the bottoms, and for this reason they failed, because the unequal wear could not be taken up.

The object of my invention is to provide a pitman with universal joints, the wear of which from use will be uniform and automatically taken up, and the joints kept tight, and has especial reference to being used on the knife-heads of mowing and reaping machines, but may be applied to other purposes.

My invention consists of a pitman with universal joints, the joints being made with ball and sockets, the sockets of which press equally on two opposite sides of the ball, so as to cause them to wear uniformly, together with a device for automatically taking up the wear, and always keeping the joints tight.

It also consists in a device for holding the several parts in place, and for readily removing them, if required.

It finally consists in making a single wedge-block and spring take up the wear automatically at both the joints of the pitman.

Figure 1:
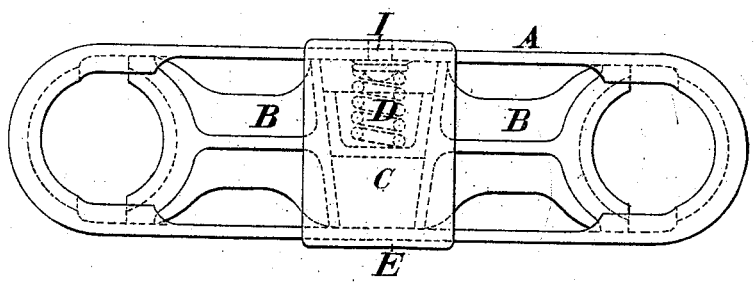
Figure 2:
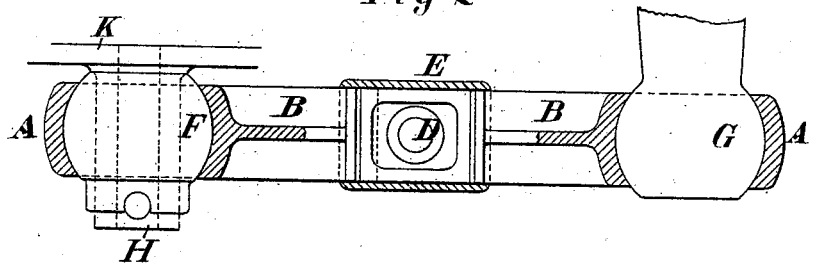
Figure 3:
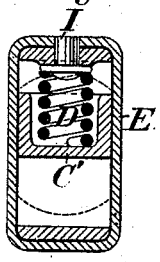

In the accompanying drawing, in which similar letters of reference indicate like parts, Figure 1 is a side elevation of a pitman embracing my invention. Fig. 2 is an edge view of the same. Fig. 3 is a transverse section of the same through the center, and shows the wedge-block and spring, and the rivet and loop which hold them in place.

A, Fig. 1, is the outer side of the pitman, and is made in a single piece, of malleable iron, or other strong metal suitable for the purpose. The ends are hollowed out or concave, to fit the balls G and F, Fig. 2. B B are blocks fitted to the inner sides of the balls G and F, forming, together with A, the bearings on the two sides of the balls in the direction of the thrust. The blocks B B are exact duplicates, and so made that when in place in the pitman there is a wedge-shaped opening, C, between their ends, Fig. 1. C' is a wedge-shaped block, recessed on its upper side, into which the spring D is placed, one end resting on the bottom of the recess, and the other against the collar of the rivet I, Figs. 1 and 3. This spring, acting upon the wedge C, causes pressure upon the ends of the blocks B B, keeping them tight to the balls G and F, Fig. 2. E is a loop, which slides over and is fitted to the outside of A. Its office is to hold the ends of the blocks B B and the wedge C' in their places, and it is held in its place by the rivet I, which is pressed out by the spring D. The ends of the blocks B B next the balls are held in place by recesses formed in the piece A, Fig. 1, The operation of the device is as follows: When it is desired to connect the balls G and F by the pitman, so as to form with it bearings for a reciprocating motion, the rivet I is pressed down till the loop E will slide to one end of the pitman; then take out the wedge-block C' and the spring D, and move back one of the blocks B until an opening is made large enough to pass the end of the pitman over the ball; press the block B against the ball, and in like manner put the other end of the pitman on the other ball, and replace the wedge-block C', after which insert the spring D. These being in place, slide back the loop E until the rivet I passes through the opening for its reception and holds it in place. For the purpose of removing one end of the pitman readily when desired, the ball F is bored to fit the pin H.

A flange on the ball F is recessed to receive the key or pin *h*, which keeps the ball from turning upon the joint between it and H. When the key *h* is removed, the ball F, with the end of the pitman, can be readily detached from the pin H, thus separating the pitman from the knife-head K.

The joints at both ends of the pitman being universal joints, it is apparent that it is not necessary that they be in line with each other, and the pitman, being narrower than the diameter of the ball, will not cramp if the axial lines of the shafts connected are not parallel.

What I claim is—

1. A pitman-joint with ball and sockets, the sockets of which press equally on opposite sides of the ball in the direction of the thrust, in combination with a device for automatically taking up the wear on the joints, substantially as and for the purposes described.

2. A single wedge-block and spring acting upon the bearings at both ends of the pitman, in the manner as and for the purposes specified.

3. The loop E, in combination with the rivet I, for keeping the parts in place, substantially as described.

ALFRED TORNQUIST.

Witnesses:
HUGH JONES.
S. NELSON WHITE.